United States Patent [19]

Harmel

[11] Patent Number: 5,832,865
[45] Date of Patent: Nov. 10, 1998

[54] MECHANICAL VEHICLE POSITIONING DEVICE

[76] Inventor: Douglas M. Harmel, 3089 Sorbus Dr., Hamilton, Ohio 45013

[21] Appl. No.: 697,212

[22] Filed: Aug. 21, 1996

[51] Int. Cl.$^6$ ................................................. B60Q 9/00
[52] U.S. Cl. ............................................ 116/28 R; 33/264
[58] Field of Search ........................... 116/28 R; 33/264, 33/286; 340/932.2

[56] References Cited

U.S. PATENT DOCUMENTS

| | | | |
|---|---|---|---|
| 2,122,253 | 6/1938 | Humphreys | 116/28 R |
| 2,854,942 | 10/1958 | Ross | 116/28 R |
| 3,817,203 | 6/1974 | Brauer | 116/28 R |
| 3,872,820 | 3/1975 | Hess | 116/28 R |
| 4,490,917 | 1/1985 | Pilling | 116/28 R |
| 4,870,413 | 9/1989 | Walden et al. | |
| 5,230,296 | 7/1993 | Giltz et al. | 116/28 R |
| 5,315,953 | 5/1994 | Mullarkey, Jr. | 116/28 R |

*Primary Examiner*—William A. Cuchlinski, Jr.
*Assistant Examiner*—Andrew Hirshfeld
*Attorney, Agent, or Firm*—Frost & Jacobs

[57] ABSTRACT

A mechanical vehicle positioning device provides a visible guide to the operator of a vehicle while that vehicle is being positioned. An indicator suspended at a desired vehicle locating position while a vehicle is being positioned can be retracted when not in use, for example, through a connection to the garage door or by motorized means.

10 Claims, 9 Drawing Sheets

MECHANICAL VEHICLE POSITIONING DEVICE

BACKGROUND OF THE INVENTION

This invention relates to a vehicle positioning device. Particularly, it relates to a mechanical device that provides a visible guide to the operator of a vehicle while the vehicle is being positioned. More particularly, it relates to an indicator suspended at a desired vehicle locating position which aids in the parking of a vehicle within a garage and which can be retracted when not in use.

Positioning a vehicle in a tight space, such as a crowded garage, can be difficult. It would be helpful to have an indicator that is visible to an operator while the vehicle is being parked. Such an indicator would allow the operator to position the vehicle in the same place each time without hitting and/or damaging the garage, any objects stored within the garage, or the vehicle itself.

It would be desirable for such an indicator to be a simple, mechanical device that would be inexpensive, easy to maintain and could be easily installed. It would be more desirable if the indicator was adjustable so that it could be adapted for use with vehicles of different sizes. Furthermore, it is aesthetically more pleasing to have a device that can be retracted when not in use. Prior art devices, such as those disclosed in U.S. Pat. No. 4,870,413, Walden, et al., issued Sep. 26, 1989, and the patents referenced therein, typically include an electric component that uses either light or sound to indicate when a vehicle is in position. Such systems may be too complex and expensive to appeal to the average homeowner. One possible solution to the problem is to suspend an object, such as a tennis ball, from the garage ceiling to indicate position. However, this solution is not aesthetically pleasing because there is no means to retract the ball out of view when it is not in use.

In contrast to the more complicated systems of the prior art, the present invention provides a simple, inexpensive mechanical device that is easily installed and maintained. The device of the present invention can also be adjusted to fit different size vehicles. Furthermore, the device of the present invention provides a more attractive solution in that the device is retractable out of sight when it is not in use.

SUMMARY OF THE INVENTION

The present invention provides a device for assisting in the positioning of a vehicle comprising:
 a. an indicator suspended at a desired vehicle locating position, wherein said indicator is visible to an operator while the vehicle is being positioned; and
 b. a means for retracting said indicator away from the vehicle locating position when the device is not in use.

The present invention further provides a device for assisting in the positioning of a vehicle wherein a retracting means comprises a first cord with two ends, wherein the first end is attached to an indicator and the second end is attached to a garage door; and further comprising a means for positioning the indicator at the vehicle locating position and means for fastening the first cord to a garage door such that the indicator is lowered to the vehicle locating position when the garage door is open and the indicator is retracted when the garage door is closed.

DETAILED DESCRIPTION OF THE PREFERRED EMBODIMENTS

As shown in FIGS. 1 through 5, the device of the present invention comprises an indicator 2 that is suspended at a desired vehicle locating position. This indicator 2 is visible to an operator who is moving the vehicle 12 while the vehicle 12 is being positioned. The device provides the operator with a visual indication of the vehicle's relative location as the vehicle 12 is being positioned within a space, for example, a garage 20. The indicator 2 is suspended in a pre-determined location relative to the desired position of the vehicle allowing the vehicle 12 to be repeatedly positioned in the same location.

In all embodiments of the present invention, the indicator 2 is suspended by a first cord 4 at the desired vehicle locating position. The first cord 4 is suspended from an overhead support 6.

For use in the present invention, the indicator 2 must be visible to the operator as the vehicle 12 is being positioned. Therefore, the indicator 2 must be large enough to be easily seen. Preferably, it is brightly colored. It can be patterned or solid in color. More preferably, the indicator 2 has fluorescent or reflective properties. It must also have sufficient weight to ensure that it will hang from the support without fluttering in a slight breeze, however, the indicator 2 is preferably light enough that it will move easily if touched by the vehicle 12 while the vehicle 12 is being positioned without causing damage to the vehicle 12. Preferably, the indicator 2 weighs between about 2 and about 3 ounces. More preferably, it weights about 2.5 ounces.

The indicator 2 can be manufactured from any material that will not damage the vehicle 12 should the indicator 2 contact it. The material should also tolerate changes in temperature such that the indicator 2 does not, for example, melt, substantially lose its shape, or crack excessively. This latter property is important since garages are generally not insulated and can get quite hot in an Arizona summer and quite cold in a Minnesota winter. In a typical temperate location, the difference between the highest summer temperatures and the lowest winter temperatures can be greater than 100° F. Preferably, the material can tolerate temperatures that range from −60° F. to 130° F. Preferably the indicator 2 comprises rubber or other elastomeric materials; plastic, either thermoplastic or thermoset; or a paper product, such as cardboard. It is helpful if the indicator 2 is not affected by changes in moisture. The indicator 2 can comprise more than one material. For example, the indicator 2 can be made from wood or metal that has been covered with a second material, for instance, rubber, foam or plastic. In fact these combined materials can be used to give the indicator 2 optimum properties. It is preferred that the indicator 2 be made from ethylene-propylene terpolymer, such as EPDM, which is manufactured by DuPont Corporation, Wilmington, Del.

There is no limitation on the shape of the indicator 2. It must have sufficient surface area to be readily visible. Preferably, the indicator 2 is a brightly colored, rubber, tear-drop shaped piece. More preferably, it is about 7/8" to about 1" in diameter at the base, tapering to about 3/8" to about 1/4" in diameter at the tip, and about 2.5" to about 3" in length, with an eyelet at the tip to facilitate fastening of the first cord 4.

The first cord 4 can comprise any material that is of sufficient strength to hold the weight of the indicator 2 and will tolerate changes in temperature and humidity without substantially changing in overall length or deteriorating. Preferably, this first cord material will not stretch over time under the weight of the indicator 2 or after repeated use. Examples of suitable materials include ropes made of natural fibers, such as cotton or hemp; metal wire; extruded plastic; and ropes made of synthetic fibers, such as polyester or Nylon. The first cord 4 can comprise more than one material, for example, it may comprise a wire coated with a plastic or elastomeric material. More preferably, the first cord 4 comprises a material that is wear and abrasion resistant. Even more preferably, the first cord 4 is brightly colored so that, like the indicator 2, it is easily visible. Most preferably, the first cord 4 comprises braided Nylon, preferably, brightly colored #18 braided Nylon rope, such as is manufactured by Aiken Manufacturing, Athens, Ga. More preferably, the first cord 4 has a diameter of about 0.058" and a tensile strength of about 140 lbs.

The indicator 2 can be attached to the first cord 4 by any means, including, but not limited to, tying the indicator 2 to the first cord 4, snaplock clips on the indicator 2 that attach to the first cord 4, Velcro strips, adhesives, tie clasps, etc. Preferably, the indicator 2 is detachably connected to the first cord 4 so that the height of the indicator 2 can be adjusted to fit different sized vehicles.

Figure 1:
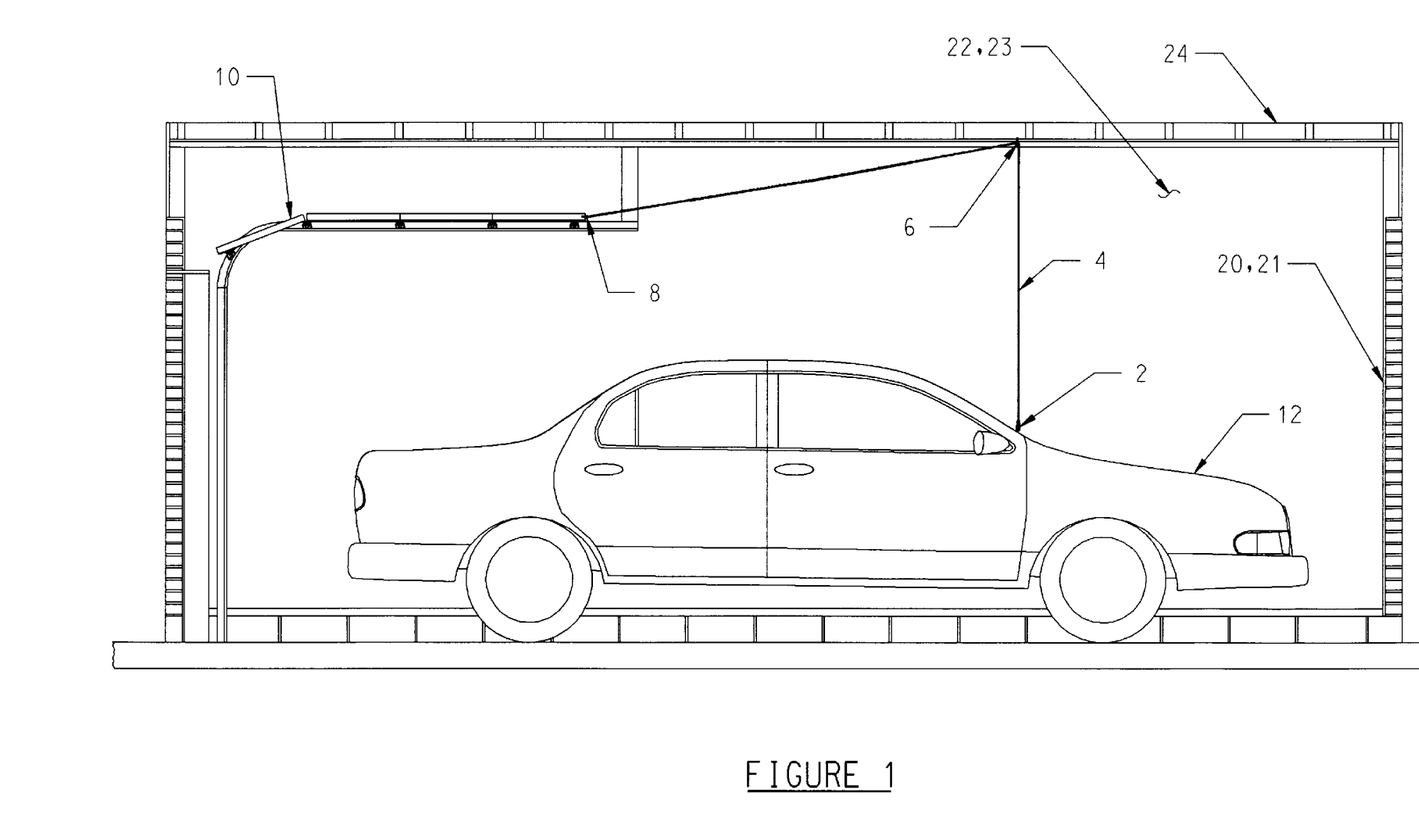
FIG. 1 is a side elevation graphic representation of a vehicle parked within a garage with the overhead garage door in the open position and the mechanical vehicle parking position indicator device fully extended.
Figure 4A:
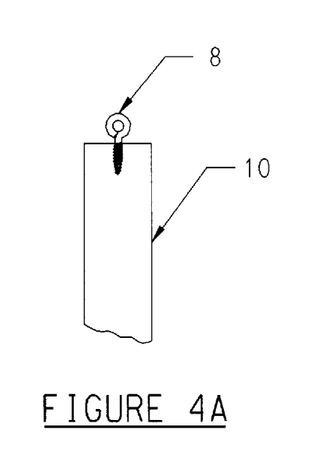
FIGS. 4A, 4B, 4C and 4D are graphic representations of methods of installation of the fasteners to the overhead ceiling or joists and the garage door.
Figure 4B:
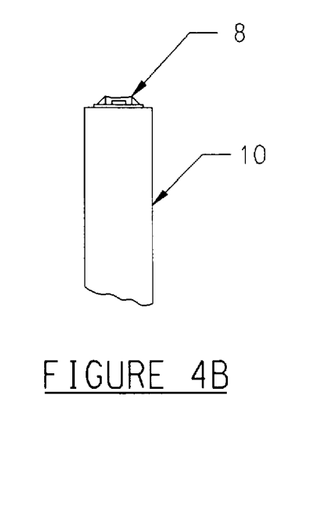
Figure 4C:
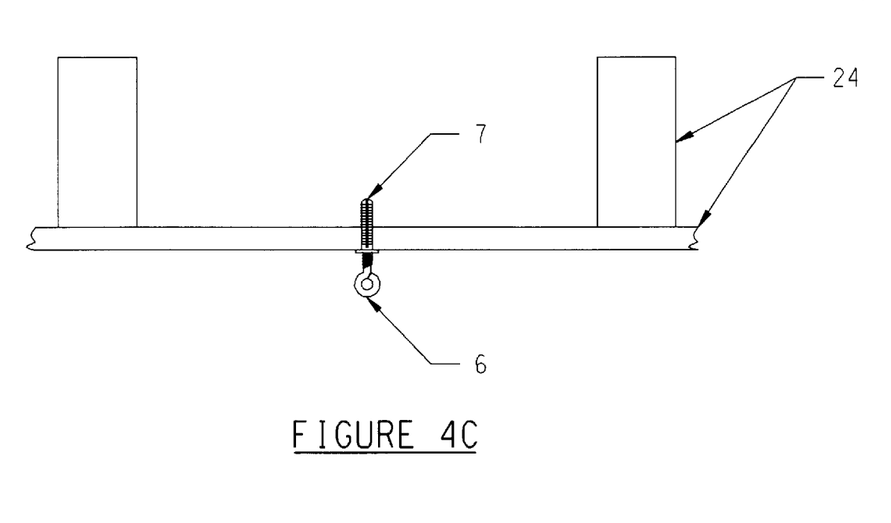
Figure 4D:
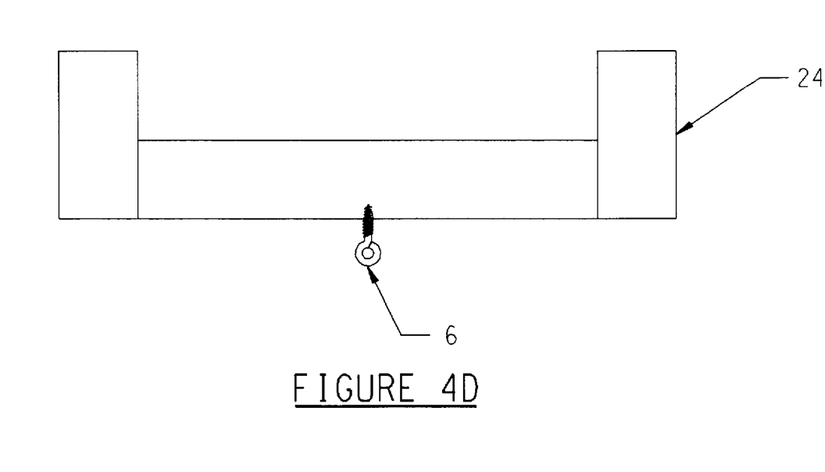

In a first embodiment of the present invention, as shown in FIG. 1, the means for retracting the first cord comprises the first cord 4, which is attached at one end to the indicator 2 and at the other end to a garage door 10. In this embodiment, a means for positioning the indicator 6 ensures that the indicator 2 is suspended at the desired vehicle locating position. Such positioning means can include, but is not limited to, a metal eyelet machine screw 6 (as shown in FIGS. 4C and 4D), an adhesively mounted bracket, or any other means that will withstand the force of the weight of the indicator 2 and the tension that develops when the first cord 4 is stretched when the garage door 10 is closed and the indicator 2 is in its retracted position, while permitting the first cord 4 to slide through it as the indicator 2 is being raised and lowered into position. Preferably, the positioning means is attached to the garage ceiling 24.

As shown in FIG. 1, the first cord 4 is attached to the garage door 10 by a means for fastening 8. The fastening means 8 can include, but is not limited to, a metal eyelet machine screw (as shown in FIG. 4A), an adhesively mounted bracket (as shown in FIG. 4B), or any other means that will withstand the tension that develops when the first cord 4 is in its retracted position.

Figure 2:
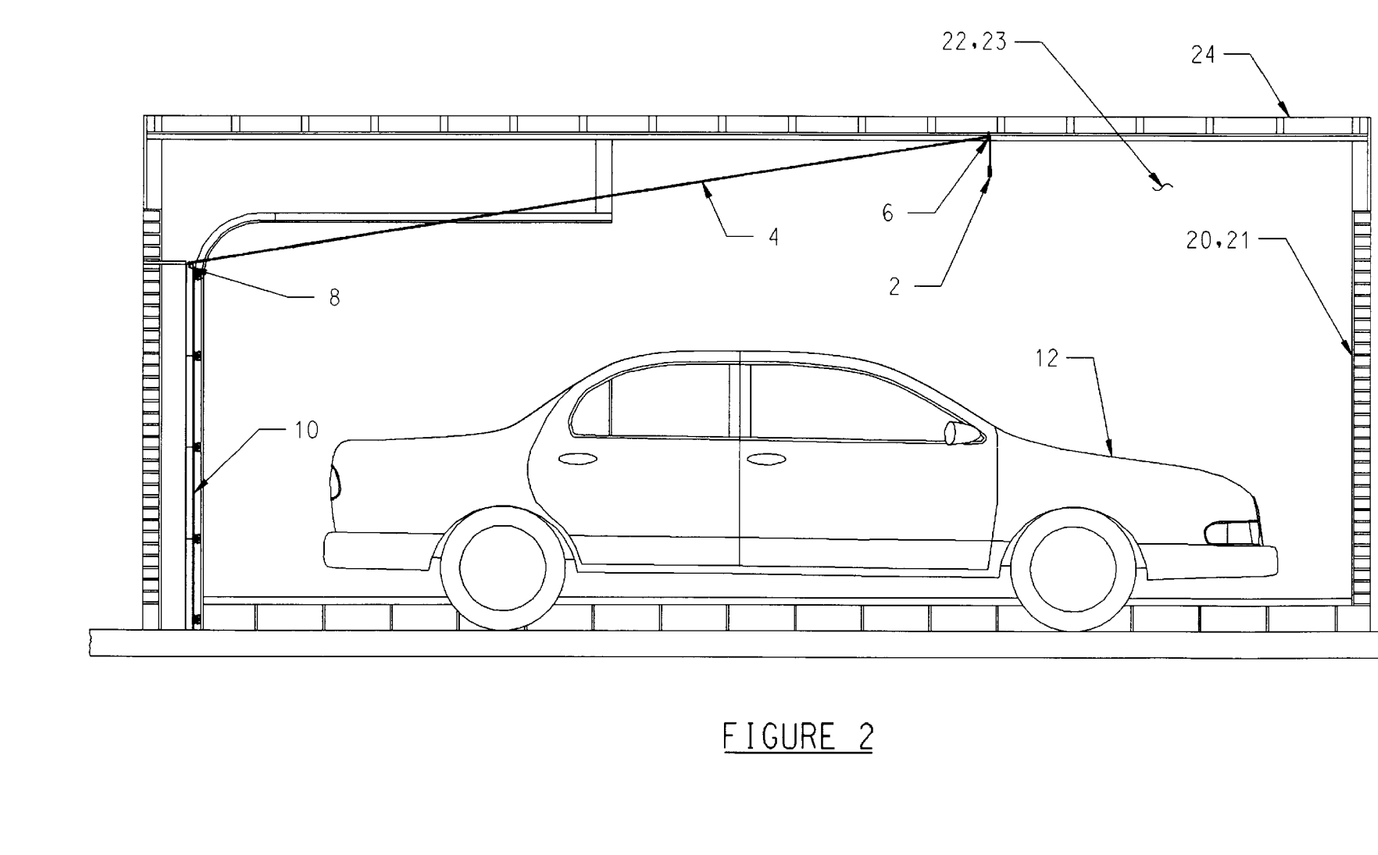
FIG. 2 is a side elevation graphic representation of a vehicle parked within a garage with the overhead garage door in the closed position and the indicator fully retracted.

More preferably, the fastening means 8 is attached to the top of the garage door 10. When the fastening means 8 is attached to the top of the garage door 10 and the first cord 4 is of the appropriate length, the indicator 2 can be retracted when the garage door 10 is closed, as shown in FIG. 2. The first cord 4 can be attached to the fastening means by any means, including, but not limited to, tying, or by clamps or ties, or other fastening means.

Depending on the height of the vehicle 12, which determines in part the length of the first cord 4, the first cord 4 might not be long enough to reach from the positioning means 6 to the fastening means 8 when the door 10 is closed. To ensure flexibility of the device, so that it can be used for all sizes of vehicles 12, it is preferable that the first cord 4 further comprise an adjustable portion 16 along its length. (See FIG. 5.) Such an adjustable portion 16 provides the first cord 4 with the ability to change its length when retracted to accommodate different size vehicles 12. Preferably, this adjustable portion comprises an elastic piece that stretches under tension as the garage door 10 is closed but springs back to its original length once the door 10 opens so that the indicator 2 is suspended in the correct position. More preferably, this adjustable portion comprises shock cord having a diameter of about 1/8". Preferably, the shock cord comprises a core material of rubber, preferably latex rubber, and a cover material of braided polyester. More preferably, the shock cord has an ability to stretch to 120% of its original length and a tensile strength of about 100 lbs. Suitable shock cords are available from Unicord Corporation, Talumet Park, Ill. The adjustable portion 16 is attached to the balance of the first cord 14 and also to the means for attaching to the garage door by any attaching means known in the art. Such means can include, but are not limited to, serrated clamps 18.

In a second embodiment, shown in FIGS. 6–13, the first cord 4 terminates at the retracting means. A second cord connects the garage door 10 to the retracting means. The second cord can be produced from any of the materials used to produce the first cord. It is not necessary, however, that the first and second cord be made of the same materials. The cord retracting means comprises a housing 30 that is mounted to the garage ceiling 24. Preferably, this housing 30 is located directly above the desired position of the vehicle. The housing 30 can be manufactured from any material that can tolerate the temperature and humidity changes experienced in a typical garage. Preferably, the material can tolerate temperatures that range from −60° F. to 130° F. More preferably, the housing 30 is manufactured from plastic, wood or metal. Most preferably, the housing 30 is manufactured from an acrylonitrile/butadiene/styrene (ABS) copolymer. The housing 30 can be constructed from two or more pieces fastened together by any fastening means known in the art.

The housing 30 contains a first spool 32 and a second spool 34, which preferably has a larger diameter than the first spool 32. The first spool 32 stores the first cord 4, which is attached to the indicator 2. The second spool 34 stores the second cord, which is attached to the garage door 10. Preferably, both the first and second spool, 32 and 34, are center mounted on a common spool axle 36, which is preferably mounted horizontally, i.e., parallel to the floor of the garage. Preferably, the first cord 4 and the second cord are wound on the first and second spools, 32 and 34, respectively, in opposing directions to one another, so that, when both spools are turning in the same direction, one spool is unwinding its cord while the other spool is winding its cord.

Means for releasably connecting the first spool 32 to the second spool 34 ensure that the two spools rotate at the same time. Such means is preferably a quick-release mechanism, such as a pin 38 permanently mounted on the end of one of the two spools, preferably the first spool 32, which engages one of a series of holes 40 in the end of the other spool, preferably the second spool 34. When this pin 38 is engaged in one of the holes 40, both spools rotate together. A means of maintaining continuous pressure on the first spool 32, thereby locking the pin 38 in the hole 40 is mounted between the housing 30 and the first spool 32. Such means can include, but is not limited to, a spool tension spring 42.

Figure 6:
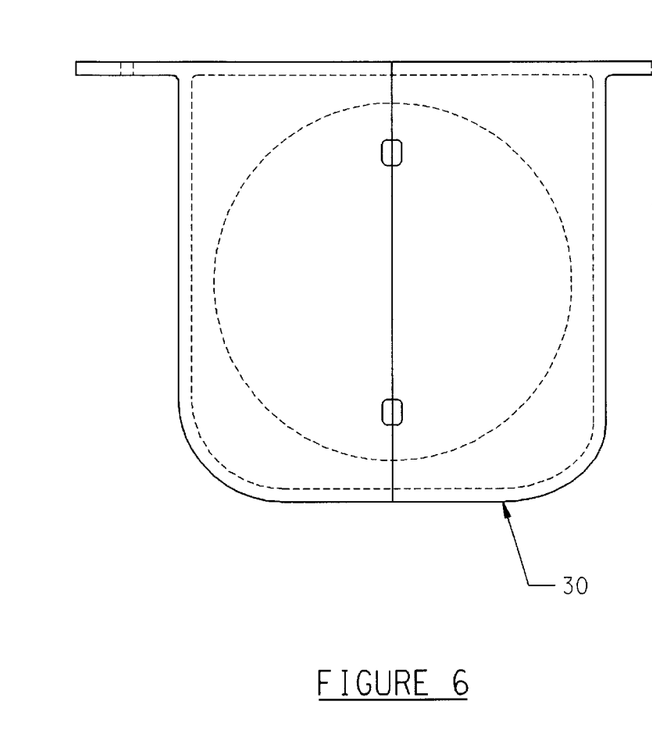
FIG. 6 is an end cut-away view showing the housing of the second embodiment.
Figure 7:
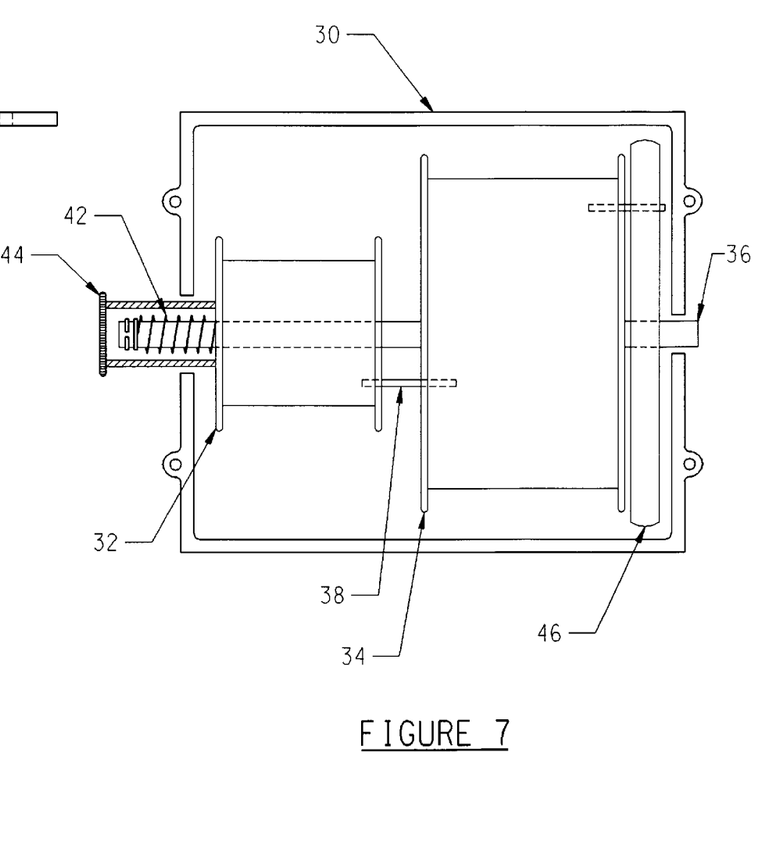
FIG. 7 is a side cut-away view of the retracting means of the second embodiment.
Figure 8:
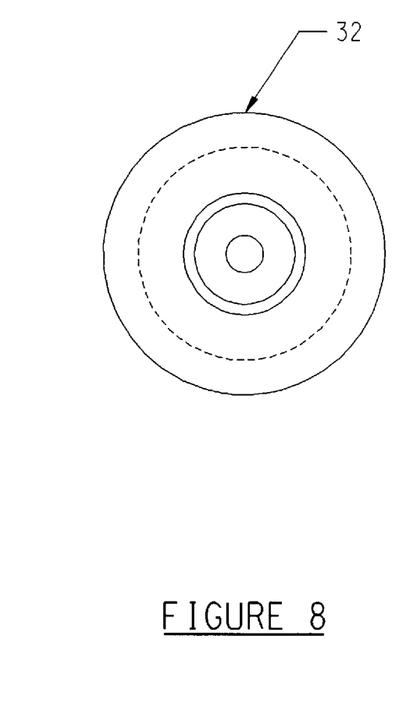
FIG. 8 is an end view of the first end of the first spool.
Figure 9:
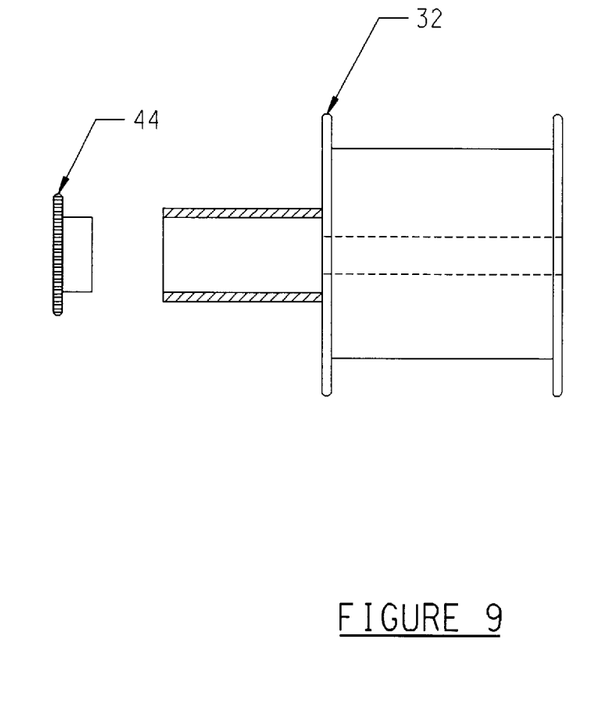
FIG. 9 is a side view of the first spool.
Figure 10:
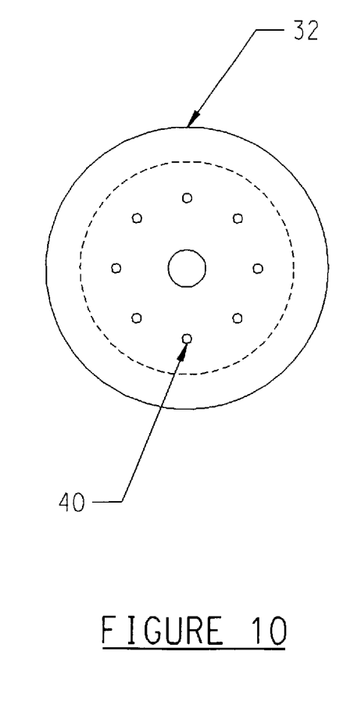
FIG. 10 is an end view of the second end of the first spool.
Figures 11, 12, 13:
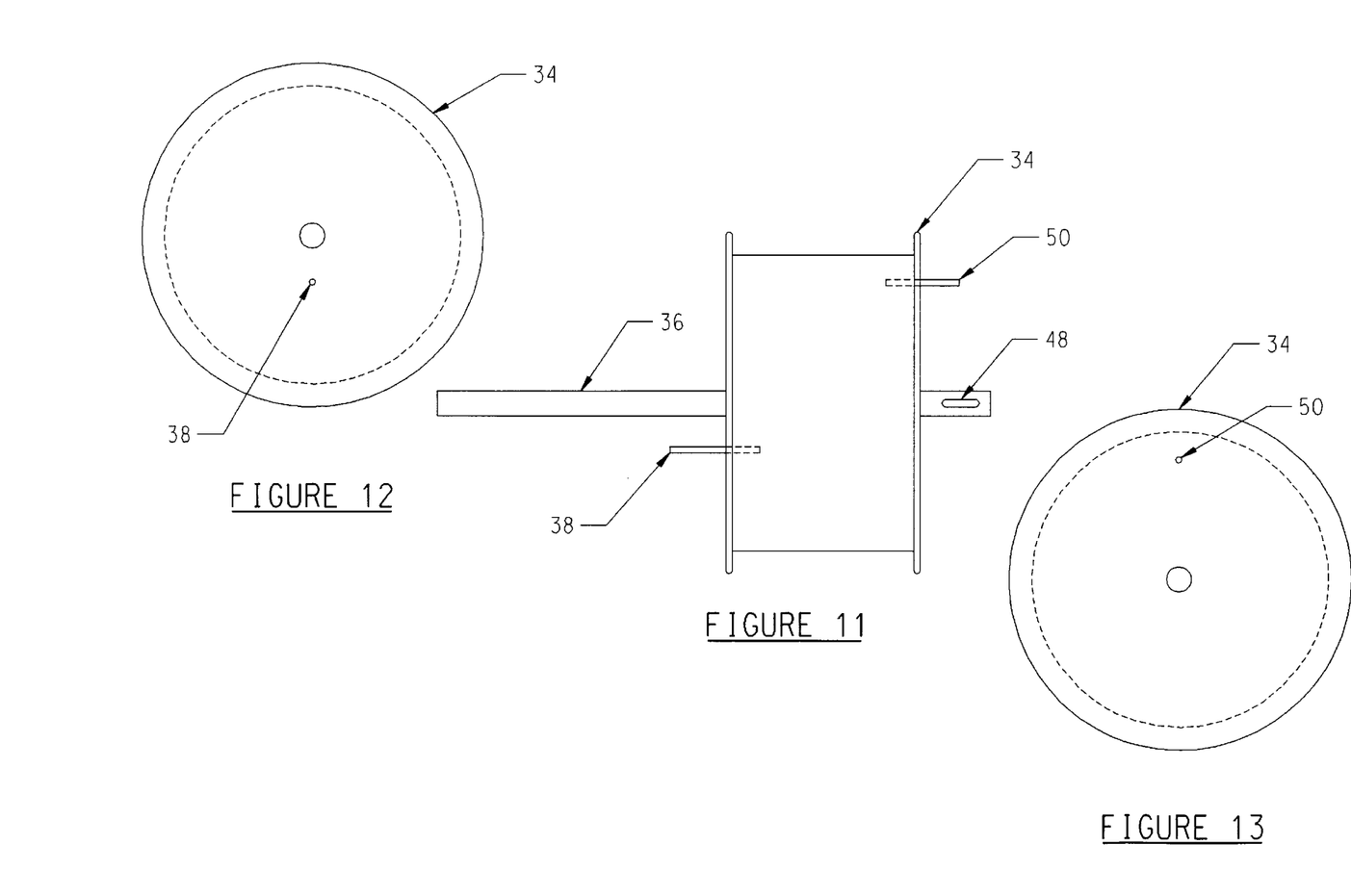
FIG. 11 is a side view of the second spool.
FIG. 12 is an end view of the first end of the second spool.
FIG. 13 is a end view of the second end of the second spool.

A means to manually oppose the spool tension spring 42 allows the pin 38 to be removed from the hole 40 and allows one spool to rotate free of the other spool. The spool tension spring 42 is attached to the common spool axle 36 at one end and contacts the first spool 32 at its other end. The opposing means compresses the spool tension spring 42 when moving the first spool 32 away from the second spool 34 so that the pin 38 is disengaged from the second spool 34. To move the first spool 32 away from the second spool 34, one can use means such as a dislocator knob 44, which is permanently attached to the first spool 32. Using the dislocator knob 44 to release the pin 38, the length of the first cord 4 can be adjusted so that the indicator 2 is positioned in the desired vehicle locating position.

A power spring 46, or other means to facilitate the retraction of the second cord when the garage door 10 is opened, can be mounted between the housing 30 and the second spool 34. The power spring 46 stores energy that can be used to extend the first cord 4 and the indicator 2 to the vehicle locating position. When the garage door 10 is fully closed, the first cord 4 is fully retracted into the housing 30, the second cord is fully extended and the power spring 46 has stored energy. This energy rotates the spool axle 36 when the garage door is opening, thereby retracting the second cord and extending the first cord 4 and the indicator 2 to the vehicle locating position. The power spring 46 can be connected at one of its ends to the common spool axle 36 by any means such as a slot 48, and at its other end to the second spool 34 by any means such as a pin 50.

Figure 14:
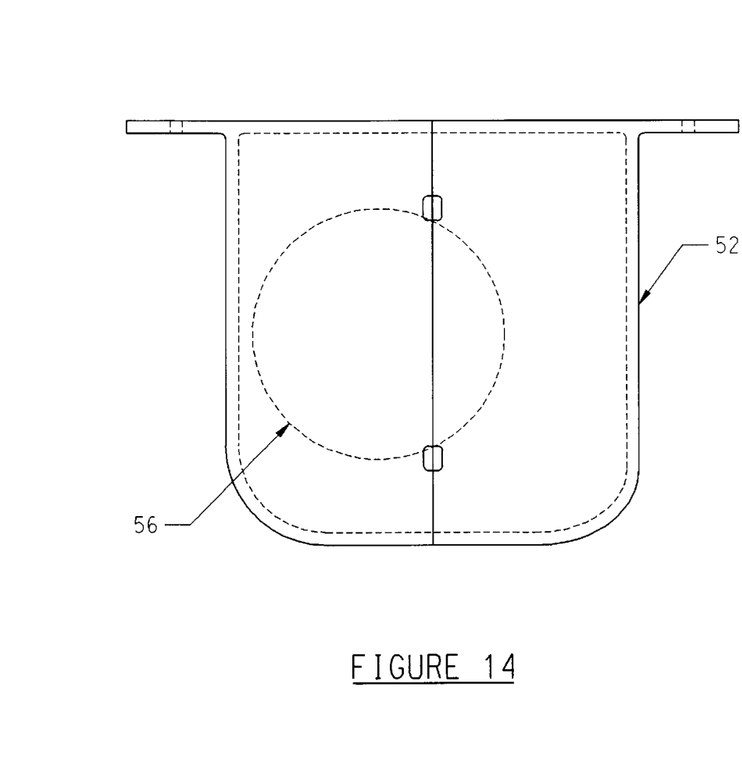
FIG. 14 is an end cut-away view of the housing of the third embodiment.
Figure 15:
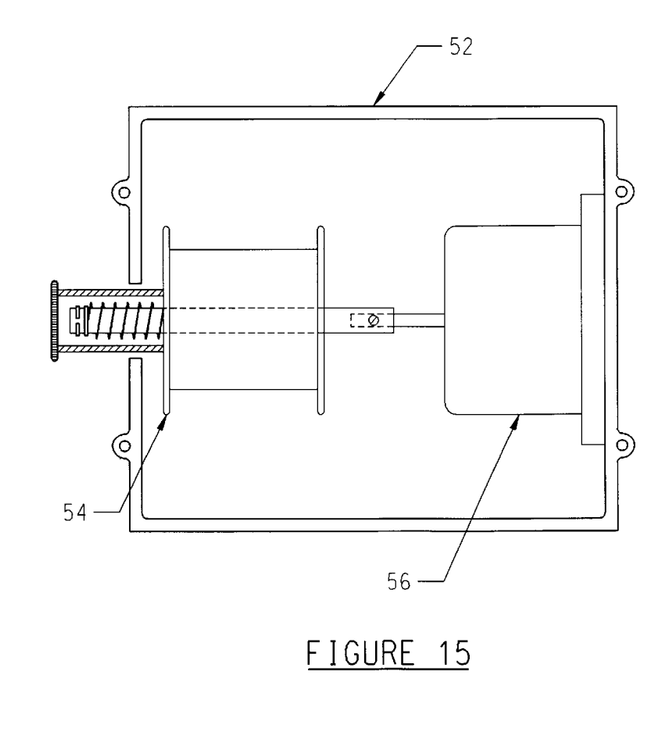
FIG. 15 is a side cut-away view of the retracting means of the third embodiment.

In a third embodiment, shown in FIGS. 14 and 15, the retraction means comprises a housing 52, similar to that in the second embodiment, however, the housing 52 contains only one spool 54 for storage of the first cord 4. A motorized means 56 of retraction within the housing 52 provides the energy to retract and extend the first cord 4. The motorized means 56 of retraction can operate using either direct current or alternating current, preferably an alternating current motor is used. The motorized means 56 of retraction can include a variable speed motor or a reduced gear motor. Preferably, the motorized means 56 is capable of sustaining a rotational speed of about 8.5 revolutions per minute to about 9.5 revolutions per minute. The retraction means further comprises a two way limit sensing switch, which is activated by the opening and closing of the garage door 10.

The limit sensing switch can be a mechanical, electromechanical or electronic switch. Preferably, it is a mechanical switch. The switch can be located anywhere within the garage 20 such that it can detect the opening and closing of the garage door 10. Preferably, it is mounted to an existing garage door mounting and guide rail, and is wired directly to a power source which supplies power to the motor. The indicator 2 is retracted by the motorized means 56 when the garage door 10 is closed and it is lowered to the vehicle locating position when the garage door 10 is opened.

The following example provides a detailed description of the assembly and use of the device of the present invention. This detailed description falls within the scope of, and serves to exemplify, the more general description set forth above. This example is presented for illustrative purposes only, and is not intended as a restriction on the scope of the invention.

EXAMPLE

Referring to FIGS. 1–5, the device comprises a first cord 4 of brightly colored braided Nylon cord 14 and an elastic shock cord 16, which are permanently joined by crimp fasteners 18; a fluorescent, brightly colored rubber tear-drop shaped indicator 2; a metal eyelet machine screw 6; an adhesive-backed plastic eyelet fastener 8 and a plastic sheetrock screw anchor 7 used to facilitate fastening of the device to a garage 20.

The device is activated by operation of the overhead garage door 10. When the overhead garage door 10 is open, the indicator 2 is fully extended downward from the ceiling 24. When the overhead door 10 is closed, the indicator 2 is in the fully retracted position.

Figure 3:
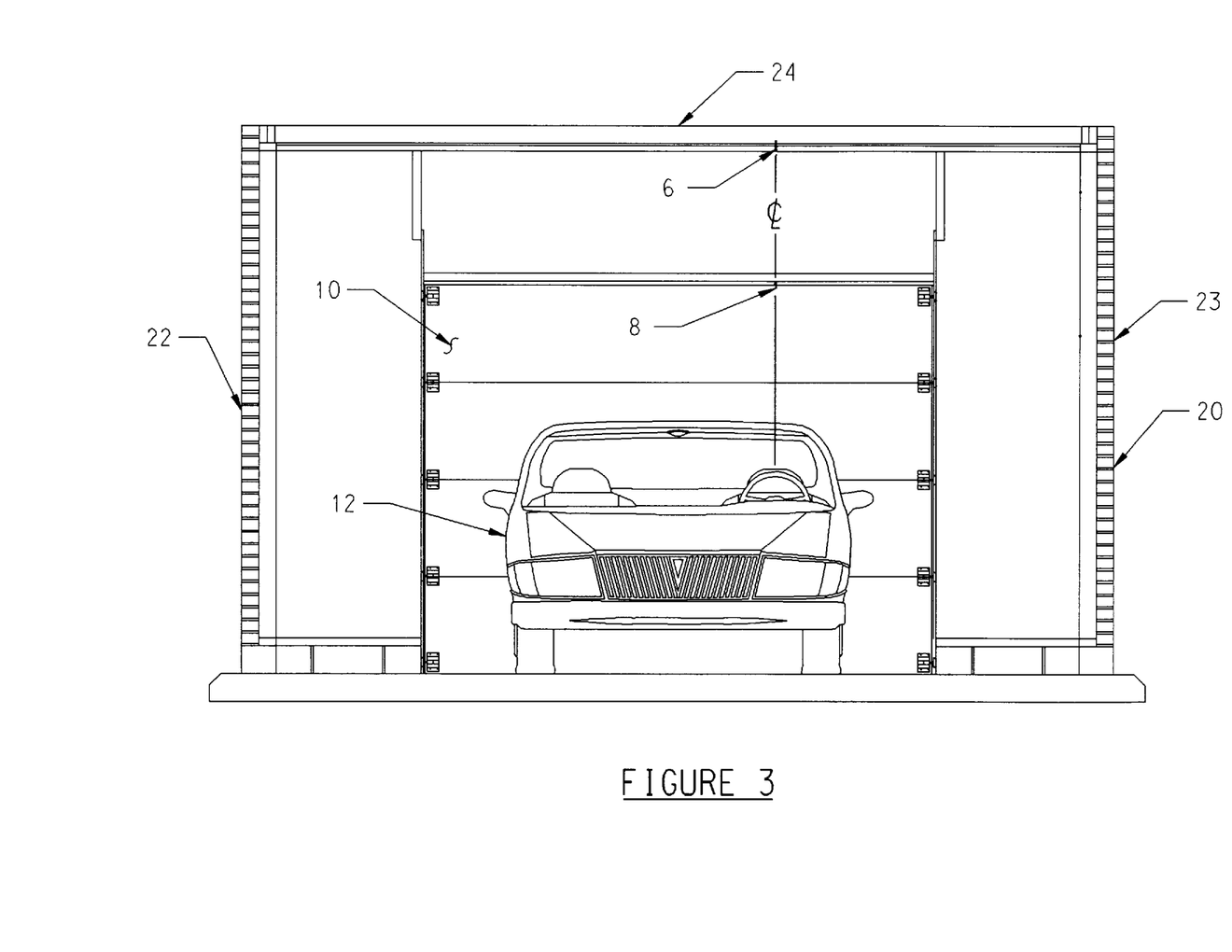
FIG. 3 is a front elevation graphic representation of a vehicle parked within a garage showing location of the indicator relative to the vehicle position.

To determine the initial mounting and installation location of the device, the vehicle 12 must first be properly positioned at the desired position in the garage 20, taking into account the necessary clearance around objects found in the garage 20, including garage walls 22, other vehicles, and any other myriad of things stored in a garage 20. With the indicator 2 attached to the uncrimped, free end of the braided Nylon cord 14, the first cord 4 and indicator 2 is suspended by the installer from the ceiling 24 and positioned in the desired vehicle locating position so as to align the indicator 2 with the vehicle's exterior windshield above the wiper blade and centered with the vehicle steering wheel. The resulting position of the first cord 4 is then marked on the ceiling 24 and an eyelet screw 6 and anchor 7 is installed at the marked position.

The distance from the nearest garage wall 21 to the installed eyelet 6 is measured. This same distance is measured from the same wall 21 to the top rail of the garage door 10. This location is marked. An adhesive-backed plastic eyelet fastener 8 is installed on the top rail of the garage door 10 at the marked location. The free end (i.e., the end not crimped to the Nylon braided cord 14) of the elastic shock cord 16 is fed through the ceiling eyelet 6 and fastened to the plastic eyelet fastener 8 with a plastic cable tie clamp. Final adjustment of the height of the indicator 2 is made by adjusting the height of the indicator 2 attached to the braided Nylon cord 16 and permanently fixed into position by tying a knot on the braided Nylon cord 16 at the indicator 2.

Because they are brightly colored, the extended indicator 2 and first cord 4 can be easily seen in either day or night by the operator when the garage door 10 is in the open position. The vehicle operator positions the vehicle in the preferred position by visually centering the indicator 2 with the vehicle steering wheel and pulling into the garage 20 until the indicator 2 touches the windshield of the vehicle. The indicator 2 may be located such that it contacts other portions of the vehicle 12, e.g., rear window, front hood ornament, middle of front windshield, etc.

Figure 5:
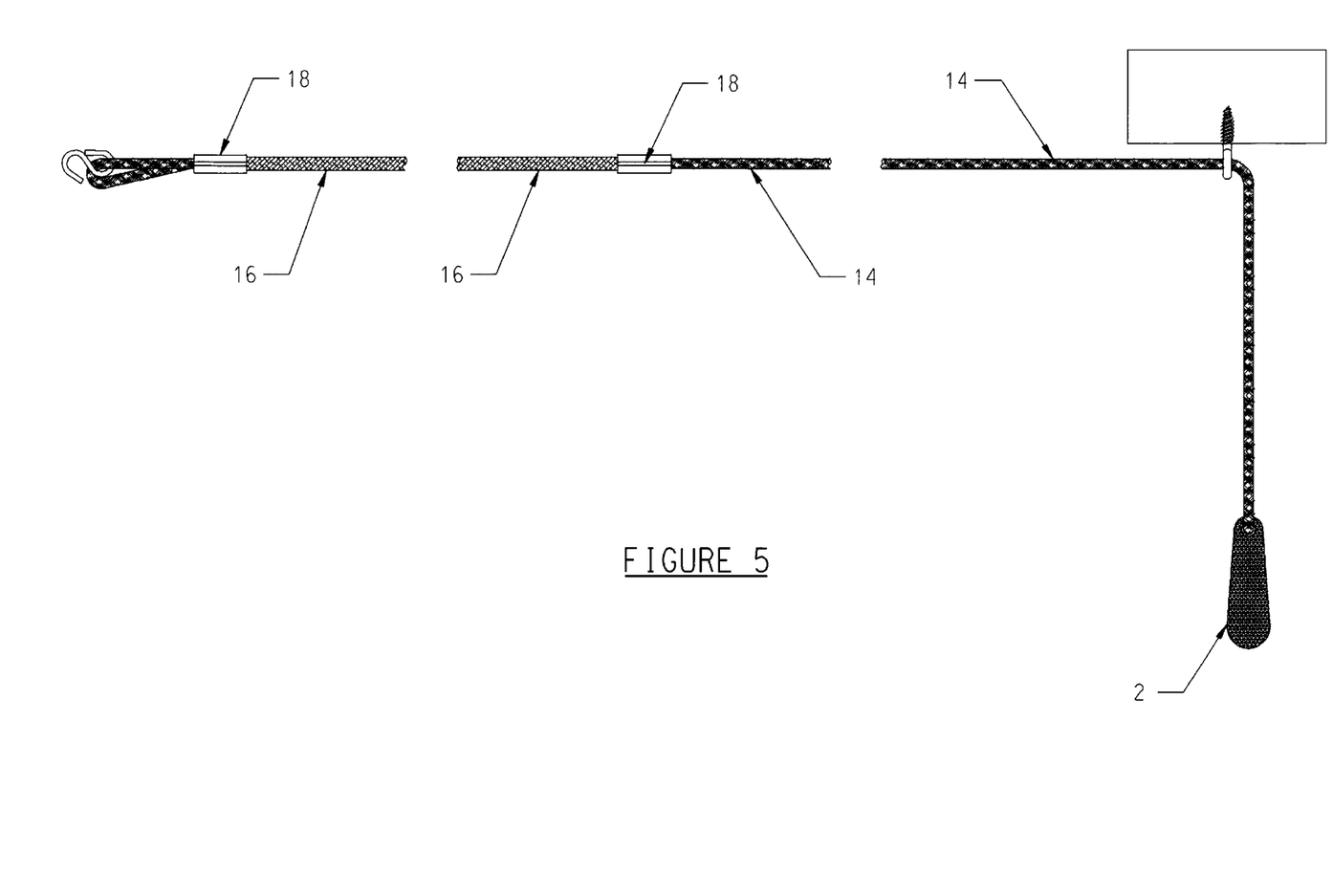
FIG. 5 is a graphic representation of the first cord and indicator.

For situations where the distance from the ceiling 24 to the vehicle windshield is less than the length of travel of the overhead garage door 10, the elastic shock cord section 16, used in combination with the braided Nylon cord 14, stretches when the device is retracted (i.e. when the overhead garage door 10 is in the closed position). The location of the eyelet fastener and the length of the Nylon braided cord can be changed to accommodate a different sized vehicle.

What is claimed is:

1. A device for assisting in the positioning of a vehicle comprising:
   a. an indicator suspended at a desired vehicle locating position, wherein said indicator is visible to an operator while the vehicle is being positioned and is suspended by a first cord;
   b. a means for retracting said indicator away from the vehicle locating position when the device is not in use, wherein said retraction means comprises a housing, a first spool, a second spool, and a second cord, wherein said second cord is attached at a first end to the second spool and at a second end to a garage door, and wherein said first cord is wound on said first spool and said second cord is wound on said second spool;
   c. a spool axle on which both said first spool and said second spool are center mounted, wherein said second spool has a diameter which is larger than the diameter of the first spool and said first cord and said second cord are wound on the first spool and second spool, respectively, in opposing directions to one another;
   d. a means for releasably connecting the first spool to the second spool, wherein said connecting means is a quick-release mechanism; and,
   e. means for storing energy to extend the first cord and indicator to the vehicle locating position;

wherein when the garage door is fully closed, the first cord is fully retracted into the housing and the second cord is fully extended, and when the garage door is fully open, the second cord is retracted into the housing and the first cord is extended and the indicator is at the desired vehicle locating position.

2. A device according to claim 1 further comprising a spring means to facilitate the retraction of said second spool.

3. A device in accordance with claim 1 wherein said means for storing energy is a power spring.

4. A device in accordance with claim 1 wherein said means for releasably connecting the first spool to the second spool is a pin mounted on the first spool such that it engages a hole in the second spool.

5. A device in accordance with claim 4 further comprising a spool tension spring that exerts pressure against the first spool such that it holds the pin in the hole.

6. A device in accordance with claim 5 further comprising a dislocator knob that manually opposes the spool tension spring and allows the pin to be removed from the hole.

7. A device for assisting in the positioning of a vehicle comprising:
   a. an indicator suspended at a desired vehicle locating position, wherein said indicator is visible to an operator while the vehicle is being positioned and is suspended by a first cord;
   b. a means for retracting said indicator away from the vehicle locating position when the device is not in use comprising a housing, a spool and a motorized means of retraction, wherein said first cord is attached to said spool and said motorized means of retraction is connected to said spool so as to cause the spool to rotate, and wherein said spool and said motorized means of retraction are contained within the housing.

8. A device according to claim 7 wherein said motorized means of retraction is selected from the group consisting of a variable speed motor and a reduced gear drive motor.

9. A device according to claim 8 wherein said motorized means of retraction is capable of sustaining a rotational speed of about 8.5 revolutions per minute to about 9.5 revolutions per minute.

10. A device according to claim 7 further comprising a two way limit sensing switch to detect the opening and closing of a garage door and to activate the motorized means of retraction upon movement of the garage door.

* * * * *